(12) United States Patent
Ghislain Bossut et al.

(10) Patent No.: US 6,750,988 B1
(45) Date of Patent: Jun. 15, 2004

(54) METHOD AND SYSTEM FOR SCANNING IMAGES IN A PHOTO KIOSK

(75) Inventors: Philippe Joseph Ghislain Bossut, Portola Valley, CA (US); Patrice Vallmajo, San Francisco, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/151,437

(22) Filed: Sep. 11, 1998

(51) Int. Cl.$^7$ .................................................. H04N 1/04
(52) U.S. Cl. .................. 358/488; 358/444; 358/474; 358/505; 358/448; 382/260
(58) Field of Search ................. 358/488, 486, 358/474, 487, 505, 506, 444, 448, 453, 464–466; 382/199, 260, 268, 289, 266, 271–273; 348/96, 97; 250/234–236

(56) References Cited

U.S. PATENT DOCUMENTS

| | | | |
|---|---|---|---|
| 5,555,042 A | * | 9/1996 | Jones et al. .................. 353/103 |
| 5,623,581 A | * | 4/1997 | Attenberg .................... 358/1.6 |
| 5,913,019 A | * | 6/1999 | Attenberg .................... 358/1.18 |
| 6,049,636 A | * | 4/2000 | Yang et al. .................. 382/289 |
| 6,369,908 B1 | * | 4/2002 | Frey et al. .................. 358/1.15 |

OTHER PUBLICATIONS

Eastman Kodak Company, "Eliminating Red–Eye", Downloaded from http://www.kodak.com/cluster/global/en/service/faqs/faq0012.shtml, Sep. 7, 1998.

"IBM/Delphi Photo Kiosk", Downloaded from http://www.ratio.com/p_photo.htm, Sep. 7, 1998.

William K. Pratt, "Digital Image Processing", ISBN:0471857661, Published by John Wiley & Sons, Inc., 1991, pp. 491–556.

* cited by examiner

Primary Examiner—Cheukfan Lee
(74) Attorney, Agent, or Firm—Martine & Penilla, LLP

(57) ABSTRACT

A method and system for operating a photo kiosk having a scanner therein, including positioning a user-provided picture on a scanner bed of the kiosk scanner in an arbitrary orientation, and automatically determining an orientation of the picture by pre-scanning, using the kiosk scanner, at least an area of the kiosk scanner bed having the picture positioned therein at a low resolution, to produce a pre-scanned image containing pixels therein, and scanning, using the kiosk scanner, an area of the scanner bed at a high resolution to provide a photo product having the picture in a desired orientation therein irrespective of the arbitrary orientation.

24 Claims, 4 Drawing Sheets

METHOD AND SYSTEM FOR SCANNING IMAGES IN A PHOTO KIOSK

FIELD OF THE INVENTION

The present invention relates to scanning images in a photo kiosk.

BACKGROUND OF THE INVENTION

Photo kiosks are booths containing hardware or software for creating image content. A consumer can, for example, place a picture in the kiosk, have the picture digitized to a digital image, edit the digital image and print the edited image on various forms of paper output. Some kiosks provide pre-designed templates into which a consumer can place his own pictures.

Some photo kiosks contain a scanner unit for converting a picture to a digital image. Typically the scanner unit in such a photo kiosk is a flat bed scanner.

Flat bed scanners are used to convert pictures to digital images by digitizing picture colors at sample locations within a fine two-dimensional spatial grid. Such scanners are typically operated by positioning a picture to be scanned on a glass surface of the flat scanner bed, closing the scanner bed cover over the glass surface, and then scanning a region of the scanner bed by means of scanning units located underneath the scanner bed. Flat bed scanners are typically connected to computers and operated using software applications.

A picture to be scanned may occupy only a small part of the full scanner bed area. In order not to scan the full scanner bed area, but rather to scan only a smaller area containing the picture, one can first apply a very low resolution pre-scan to the entire scanner bed area, and then use the pre-scanned digital image to set scanner parameters and select a suitable region surrounding the picture. Such a low-resolution scan can be at a resolution of approximately 24 dots per inch (dpi).

A high resolution scan is costly both in time spent scanning and in scanned image file size. If one were to scan the entire scanner bed area with a high resolution scan, most of the time spent and most of the image data could pertain to the empty part of the scanner bed that does not contain the picture. Moreover if scanner parameters, such as color look-up tables and contrast, are not set properly, the scan may have to be repeated. A pre-scanned digital image can be used to set scanner parameters, and also to select a region of interest that surrounds the picture. By setting the scanner parameters in this way, and selecting a region of interest, one ensures that the high resolution scan captures only a sub-area of the entire scanner bed area that contains the picture within it, and that the scanner parameters are properly set before performing the high resolution scan.

In photo kiosks that contain scanners, the scanner unit is typically located inside the kiosk. The consumer may not be able to see the scanner. He may not be able to control the scanner settings, and he may not even be able to view a pre-scanned image. Moreover, even if it were possible to provide such control, it would only serve to complicate the operation of a photo kiosk, thereby frustrating and distancing potential consumers who may have very little or no experience with scanner devices.

SUMMARY OF THE INVENTION

There is provided in accordance with a preferred embodiment of the present invention a method for operating a photo kiosk having a scanner therein, including positioning a user-provided picture on a scanner bed of the kiosk scanner in an arbitrary orientation, and automatically determining an orientation of the picture by pre-scanning, using the kiosk scanner, at least an area of the kiosk scanner bed having the picture positioned therein at a low resolution, to produce a pre-scanned image containing pixels therein, and scanning, using the kiosk scanner, an area of the scanner bed at a high resolution to provide a photo product having the picture in a desired orientation therein irrespective of the arbitrary orientation.

There is also provided in accordance with a preferred embodiment of the present invention a method for determining the orientation of a scanned image for use within a photo kiosk having a scanner therein, including the steps of positioning a user-provided picture on a scanner bed of the kiosk scanner in an arbitrary orientation, scanning, using the kiosk scanner, a preliminary region of the scanner bed having the picture positioned therein, to produce a preliminary scanned image containing pixels therein, determining a plurality of bounding boxes confining the picture within the preliminary scanned image, selecting one of the plurality of bounding boxes confining the picture, and calculating a positioning angle based on the selected bounding box.

There is also provided in accordance with a preferred embodiment of the present invention a system for scanning pictures within a photo kiosk, including a kiosk scanner having a kiosk scanner bed for positioning a picture thereon in an arbitrary orientation, and a kiosk processor automatically determining an orientation of the picture by pre-scanning, using the kiosk scanner, at least an area of the kiosk scanner having the picture positioned therein at a low resolution to produce a pre-scanned image containing pixels therein, and scanning, using the kiosk scanner, an area of the scanner bed at a high resolution to provide a photo product having the picture in a desired orientation thereon irrespective of the arbitrary orientation.

There is also provided in accordance with a preferred embodiment of the present invention a system for determining the orientation of a scanned image for use within a photo kiosk, including a kiosk scanner having a kiosk scanner bed for positioning a picture thereon in an arbitrary orientation, a kiosk processor determining a plurality of bounding boxes confining the picture within the preliminary scanned image, a selector selecting one of the plurality of bounding boxes confining the picture, and an image processor calculating a positioning angle based on the selected bounding box.

There is also provided in accordance with a preferred embodiment of the present invention a photo kiosk, including a scanner having a scanner bed for positioning a picture thereon in an arbitrary orientation, and apparatus for determining a bounding box confining the picture within a pre-scanned image, the pre-scanned image being produced by pre-scanning an area of the scanner bed having the picture positioned thereon, and the bounding box having edges parallel to the edges of the scanner bed.

There is also provided in accordance with a preferred embodiment of the present invention a photo kiosk, including a scanner having a scanner bed for positioning a picture thereon in an arbitrary orientation, and apparatus for determining the orientation of the picture within a preliminary scanned image, the preliminary scanned image being produced by pre-scanning an area of the scanner bed having the picture positioned thereon.

BRIEF DESCRIPTION OF THE DRAWINGS

The present invention will be more fully understood and appreciated from the following detailed description, taken in conjunction with the drawings in which.

LIST OF APPENDICES

Appendix A is a listing of software in a C++ programming language for use in the operation of a kiosk to automatically select a region of interest surrounding a picture within a pre-scanned image, in accordance with a preferred embodiment of the present invention.

DESCRIPTION OF A PREFERRED EMBODIMENT

In a photo kiosk operating environment it is necessary to perform the setting of parameters and selection of a region of interest completely automatically, without any manual intervention, using only a low-resolution pre-scanned digital image. Specifically, a picture is positioned on a scanner bed in an arbitrary orientation either by a user or an automatic feeder, and the photo kiosk automatically selects a region of interest. The picture may not be positioned flush with any edge of the scanner bed, and may not even be situated in parallel alignment to the edges of the scanner bed. That is, the picture could be rotated relative to the edges of the scanner bed.

Figure 1A:
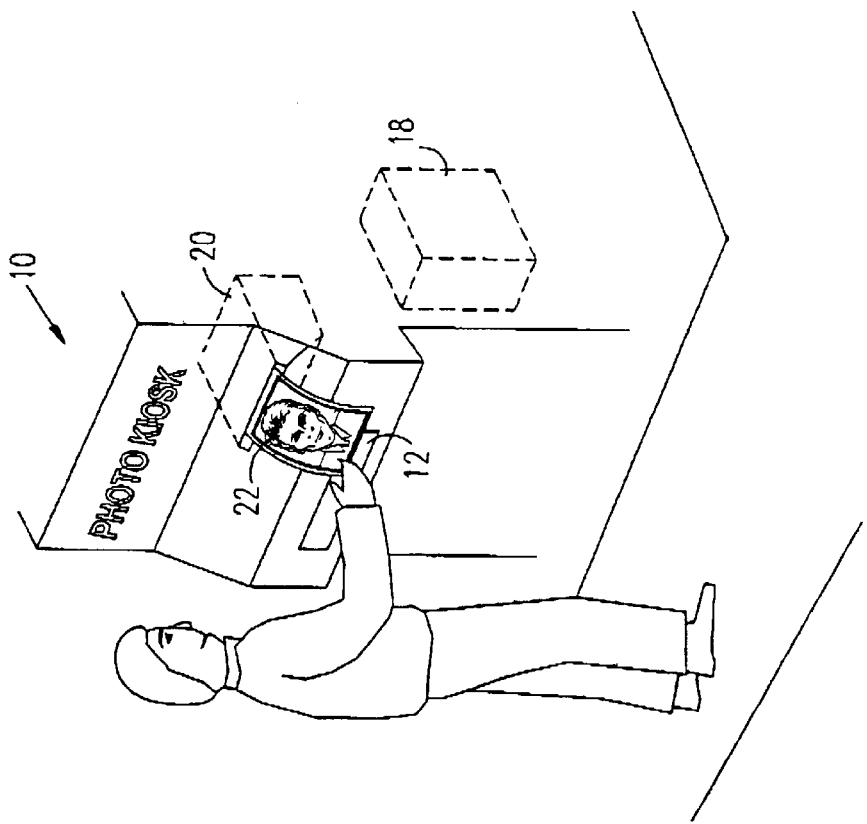
FIGS. 1A and 1B are simplified illustrations of a photo kiosk having a scanner therein, operating in accordance with a preferred embodiment of the present invention to properly orient a picture that is placed on the scanner in an arbitrary orientation.
Figure 1B:
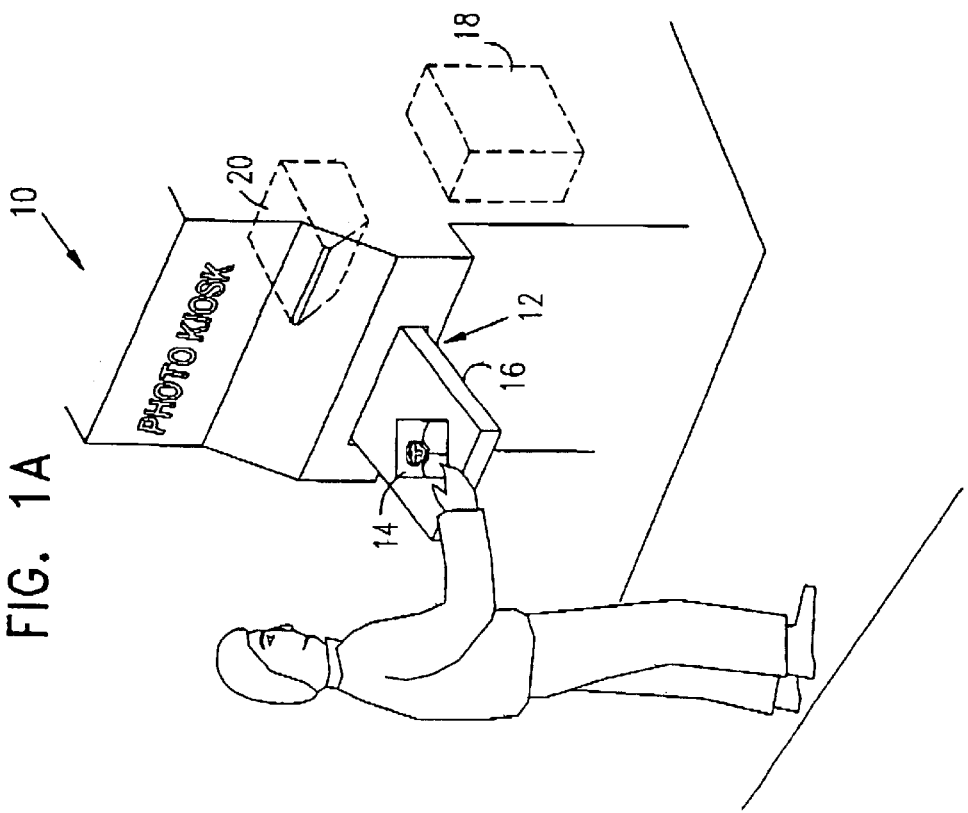

Reference is now made to FIGS. 1A and 1B, which are simplified illustrations of a photo kiosk 10 having a scanner 12 therein, operating in accordance with a preferred embodiment of the present invention to properly orient a picture 14 that is placed on scanner 12 in an arbitrary orientation. The photo kiosk 10 shown in FIG. 1A and FIG. 1B has a protruding slideable scanner bed 16, for placing picture 14 thereon, a kiosk processor 18 for carrying out digital image manipulations, and a printer device 20 for outputting photo products, such as a poster, personalized stationary, business cards, an invitation or a calendar.

In FIG. 1A a user places picture 14 on protruding slideable scanner bed 16 in an arbitrary orientation. The placement of picture 14 need not be flush with any edge of scanner bed 16, nor in parallel alignment with edges of scanner bed 16. After the scanner bed 16 slides back into kiosk 10, scanner 12 operates to digitize picture 14. In an alternate embodiment, scanner 12 may include an automatic feeder (not shown) that accepts picture 14 from the user and feeds picture 14 into position on scanner bed 16 in an arbitrary orientation. In either embodiment, after scanner 12 operates to digitize picture 14, kiosk software or hardware operating in accordance with a preferred embodiment of the present invention calculates the orientation of picture 14 within scanner bed 16.

In FIG. 1B kiosk 10 uses the calculated orientation information to correctly adjust the alignment of the picture. When the user prints the photo product 22, the picture 14 is properly aligned therein.

A first approach in automatically selecting a region of interest surrounding a picture in a pre-scanned digital image, may be to look for a constant color background where only the scanned scanner cover is present, but not the picture. However, scanner covers are often made of material that does not reflect a constant color, and may give rise to complicated patterns when scanned. In addition, there may be fine scratches in the glass surface of the scanner bed, or fine patterns in the surface of the scanner cover, and these can show up as faint edges in the scanned image. As a result, the background where only the scanned cover has been scanned may not have a constant color background, and may even have a complicated coloration pattern. As such, it may not be readily discernible by an automated processor.

The present specification describes a method and system for automatically identifying an accurate region of interest surrounding a picture from a pre-scanned digital image, without any manual intervention. It also describes a method for determining the angle of orientation of the picture relative to the edges of the scanner bed, also without any manual intervention. The angle of orientation can be used to later correct the scanner image for a positioning of the picture on the scanner bed that was not aligned with the directions of the edges of the scanner bed.

As used herein, the term "pixel" denotes an element of a digital image. A pixel has both a location, referred to as the pixel location, and a color, referred to as the pixel color. The pixel color is characterized by a pixel color value, which is typically a triplet of three individual color channel values, such as red (R), green (G) and blue (B). The R, G and B values may be 8-bit integer values ranging from 0 to 255. Many other well-known color spaces may also be used, and color channels may also have precisions other than 8 bits.

As used herein, the term "picture" denotes an object placed on the surface of a scanner bed to be converted to a digital image by scanning. Pictures include drawings, photographs, document pages, three-dimensional objects such as a book, and more.

The "angle of orientation" referred to herein can be either the orientation of the picture relative to the scanner bed, or the orientation of the subject matter within the picture relative to the scanner bed. In particular, preferred embodiments of the present invention can be used to correct for positioning of the picture that was not aligned with the edges of the scanner bed, or for positioning of the subject matter within the picture that was not aligned with the edges of the picture, or for a combination of both.

Identifying a Region of Interest

In a preferred embodiment, the present invention operates by applying an edge filter to the pre-scanned image, so as to detect the edges therein. Edge filters use gradients in pixel color values to detect edges. An example of such an edge filter is the familiar Sobel filter. A general reference for edge filters is Pratt, William K., "Digital Image Processing," ISBN: 0471857661, published by John Wiley & Sons.

The result of an edge filter is an edge map, which is a monochrome image having gray-scale edge values at the pixel locations of the pre-scanned image, each edge value corresponding to the presence or absence of an edge at a pixel location, and the strength of such an edge. The stronger the edge at a given pixel location, the darker the edge value at that location. Edge maps look somewhat like x-rays.

When an edge map has been determined, edges can then be identified as groups of adjacent pixels, as described herein below.

After the edge map is generated, a preferred embodiment of the present invention identifies those edges that are considered "significant," in order to distinguish between actual edges from the picture and faint edges that might be due to scratches on the glass surface of the scanner bed or patterns on the inside of the scanner cover. Using a method referred to as "hysteresis," a pixel is deemed to belong to a significant edge if it is part of a group of at least twenty adjacent pixels, each of which has an edge value above a prescribed lower threshold, and at least one of which has an edge value above a prescribed upper threshold. Two pixel locations are considered adjacent if one is a neighbor of the other in any of the eight compass directions, N, NE, E, SE, S, SW, W and NW. Specifically, a pixel at location (i, j) is adjacent to the eight pixel at locations (i−1, j−1), (i−1, j), (i−1, j+1), (i, j−1), (i, j+1), (i+1, j−1), (i+1, j) and (i+1, j+1).

After the significant edges have been identified, the desired region of interest is determined by finding a bounding box that has sides parallel to the edges of the scanner bed, and that encloses all pixels belonging to significant edges.

Figure 2:
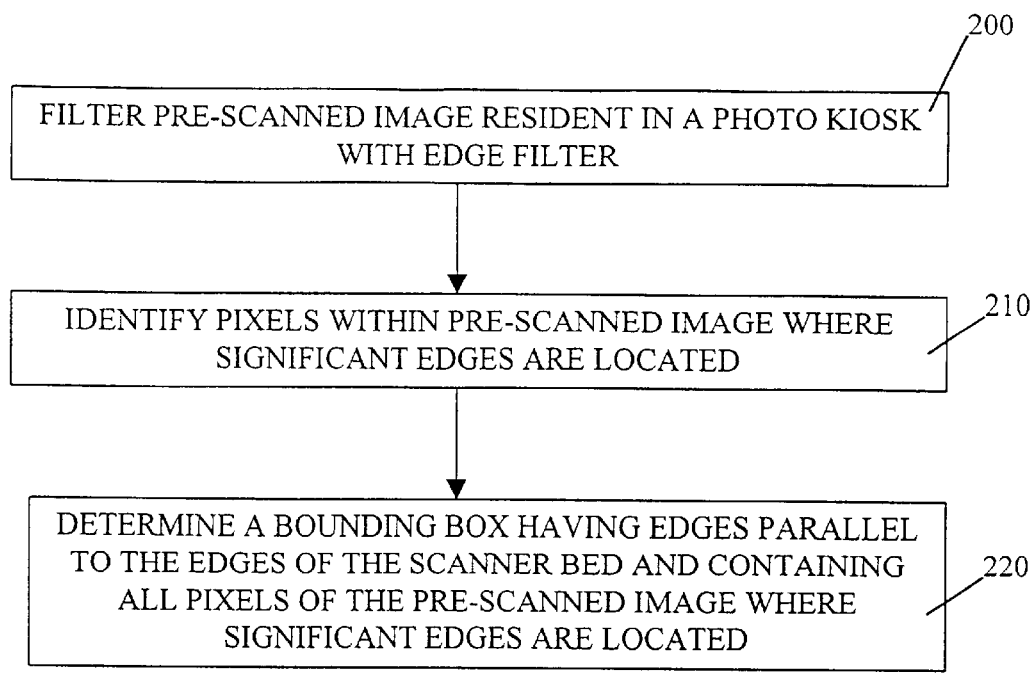
FIG. 2 is a simplified flow chart of a preferred embodiment of the present invention used to determine a region of interest containing a picture from a pre-scanned image.

Reference is now made to FIG. 2, which is a simplified flow chart of a preferred embodiment of the present invention used to determine a region of interest containing a picture from a pre-scanned image. At step 200 the pre-scanned image is filtered with an edge filter, to determine an edge map. At step 210 the pixels within the pre-scanned image where significant edges are present, are identified. At step 220 the bounding box with edges parallel to the edges of the scanner bed, and that contains all of the pixels within the pre-scanned image where significant edges are located, is selected. In a preferred embodiment, the smallest such bounding box is selected.

Reference is now made to Appendix A, which is a listing of software in the C++ programming language for use in the operation of a kiosk to automatically select a region of interest surrounding a picture within a pre-scanned image, in accordance with a preferred embodiment of the present invention. The kiosk software introduces a structure for an edge element, PedgeElt, containing a row, a column, a pointer to a Boolean value and a pointer to a next edge element as members. The software also introduces a class, PedgeIterator, for a list of edge elements. Such a list is built up from successive calls to a method AddTail(i, j, val), which appends an edge element onto an existing list. The Boolean values to which each edge element in a list of edge elements contains a pointer to, are set by a method Validate (val).

The kiosk software uses a signed integer array, gradient[ ], to store the values of the edge map, and it uses a Boolean array of flags, edge[ ], to locate the significant edges. Both arrays are serialized one-dimensional arrays, and have the same number of elements as total pixels in the image. For the element corresponding to the pixel at location (i, j), the value of gradient gives the edge value at location (i, j), and the value of edge flag indicates whether there is (true) or is not (false) a significant edge at location (i, j).

The main processing occurs within the method CroppingArea. As can be seen from the listing, CroppingArea computes the intensity image intensity[i][j] by invoking the method ComputeIntensity, and then the edge map, gradient[ ], by invoking the method ComputeLaplace3×3. The method ScratchRemoval locates the significant edges and stores them by means of the Boolean map, edge[ ], and the method BoundingRectangle computes the smallest bounding box containing the significant edges.

When ComputeLaplace3×3 is invoked, the Boolean map edge is set to true wherever the value of gradient exceeds highthreshold. When ScratchRemoval is invoked, additional values of edge are set to true whenever a list of contiguous edge elements is located, at each of which the value of gradient exceeds lowthreshold, and when the list has a size of at least lengththreshold. The default for lengththreshold is taken to be twenty. When such a list has been located, the setting of edge flags in the list to true is accomplished through the Validate method, since the edge elements contain pointers bool* value to Boolean values and Validate sets the references of the pointers, *value, to true. Conversely, if the size of a list is less than lengththreshold, then the edge flags in the list are set to false, including locations where gradient exceeds highthreshold.

The method that tracks contiguous edge elements is called EdgeHysterysisFollow, and operates recursively, building up a list of contiguous edge elements, list. EdgeHysterysisFollow uses an array of pointers to Boolean values, known_ptr[ ], to keep track of locations that have already been identified. At each level of the recursion EdgeHysterysisFollow invokes a call to itself at a neighboring pixel where the value of gradient exceeds lowthreshold. At each call the list is successively built up with the instruction list->AddTail (i, j, edges_ptr). When all contiguous edge elements are joined together in list, control returns to ScratchRemoval, where the entire list of edge elements is validated with true if its size exceeds lengththreshold, and with false if its length is less than lenghthreshold.

The BoundingRectangle method finds the top of the bounding box by searching the edge flags, in order of increasing row, i, and breaking as soon as it encounters an edge flag of true. It finds the bottom of the bounding box by searching the edge flags, in order of decreasing row i, and breaking as soon as it encounters an edge flag of true. Similarly it finds the left and right sides of the bounding box by searching the edge flags in order of increasing column, j, and decreasing column, respectively.

Identifying an Angle of Rotation

In a preferred embodiment such as that shown in FIGS. 1A and 1B, the present invention identifies an angle of rotation by first detecting all of the significant edges of the pre-scanned image, in the manner described hereinabove. Once the significant edges are determined, minimal bounding boxes are identified in each of a range of directions relative to the edges of scanner bed 16. Specifically, for a given direction determined by an angle, X, a minimal bounding box having two parallel edges oriented in the direction of angle X and two parallel edges oriented in the perpendicular direction, is chosen so as to contain all of the significant edges within it, and to be as small as possible. The minimal bounding box can be determined starting with any initial bounding box having two parallel edges oriented in the direction of angle x and two parallel edges oriented in the perpendicular direction, that contains all of the significant edges within it, by successively moving its edges parallel and closer together until each edge reaches a pixel where a significant edge is present.

Determination of a minimal bounding box is carried out for a range of angles X. After these minimal bounding boxes have been determined, a search is made for the "smallest" one. The criterion for being smallest can be based on the smallest width, or the smallest height or the smallest area, or another such criterion. The angle X corresponding to the smallest of the minimal bounding boxes is taken to be the sought after angle of rotation of the picture relative to the edges of the scanner bed. The rationale for this is that the "snuggest" box should be the one aligned with the picture.

Figure 3:
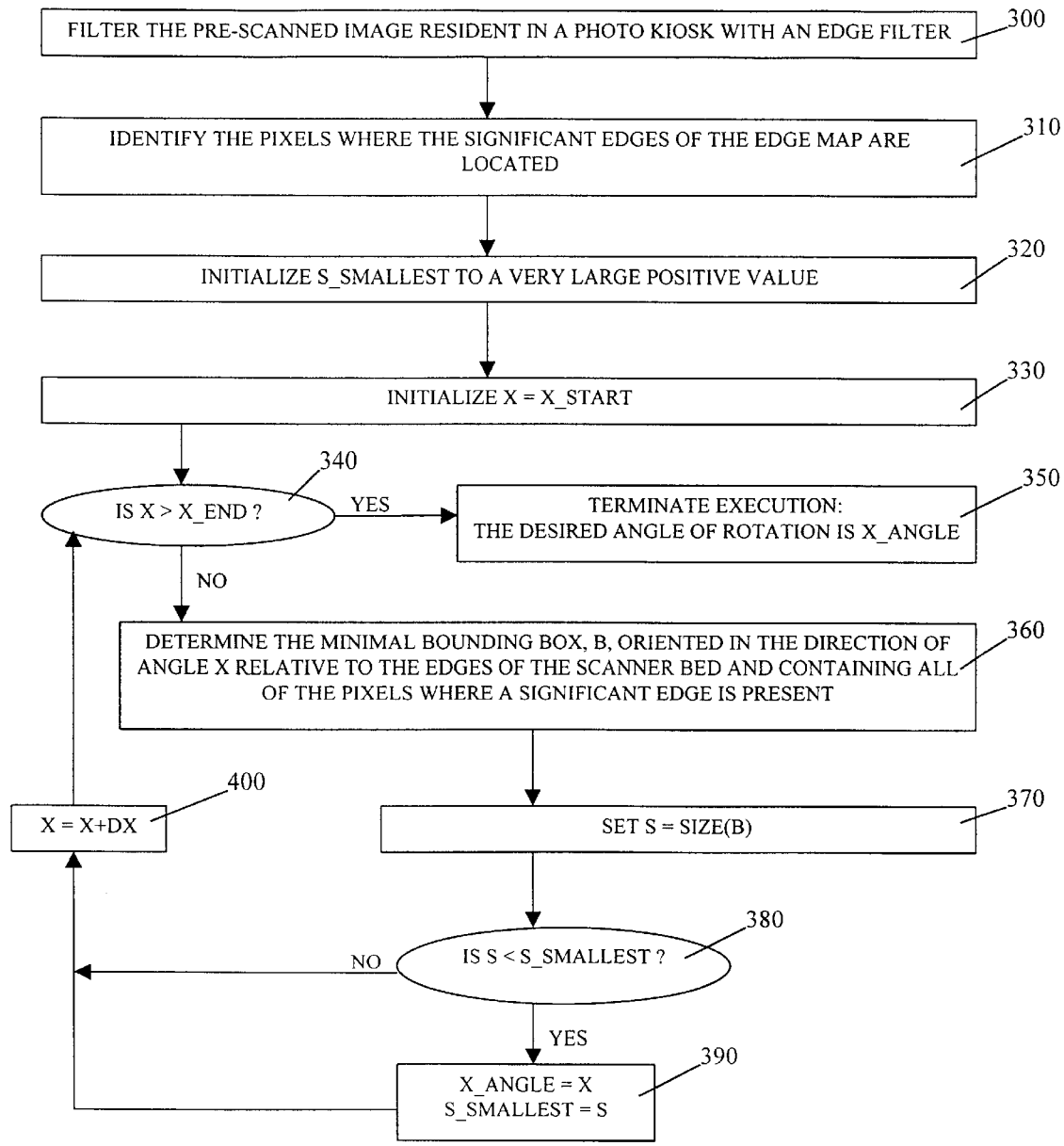
FIG. 3 is a simplified flowchart of a preferred embodiment of the present invention for determining the angle of rotation of a picture relative to the edges of a scanner bed.

Reference is now made to FIG. 3, which is a simplified flowchart of a preferred embodiment of the present invention for determining the angle of rotation of the picture relative to the edges of the scanner bed, from a pre-scanned image. The flowchart describes a search for a bounding box with the smallest size, as the angle of orientation of the bounding box is varied. The delimiters for the angular variation are denoted by X_START and X_END; i.e., the angle X varies between X_START and X_END at increments of DX. The variable that stores the size of the smallest bounding box already found as the search advances over the range of angles, is denoted by S_SMALLEST.

As was done in FIG. 2, at step 300 an edge filter is applied to the pre-scanned image, to produce an edge map. At step 310 the significant edges within the edge map are identified. At step 320 S_SMALLEST is set to a very large positive value. At step 330 an angular direction X is initialized to a starting value X_START. At step 340 a check is made whether X exceeds a final value X_END. If so, then execution terminates at step 350, and the desired angle of rotation is X_ANGLE. If not, then at step 360 a determination is made of the minimal bounding box oriented in the direction of angle X relative to the scanner bed edges and containing all of the pixel locations where a significant edge is present. At step 370 a "size" S of the minimal bounding box is recorded. The size may be the width, or the height or the area, or any other such measure. At step 380 a check is made whether S is less than the minimal size S_SMALLEST. If so, then at step 390 the angle X_ANGLE is set to X, and the size S_SMALLEST is set to S. If not, then at step 400 the angle X is incremented by a small amount DX, and control returns to step 340. Note that because S_SMALLEST was set to a very large positive value in step 320 and because X_END is greater than X_START, step 390 will be executed at least once to set X_ANGLE to X.

Figure 4:
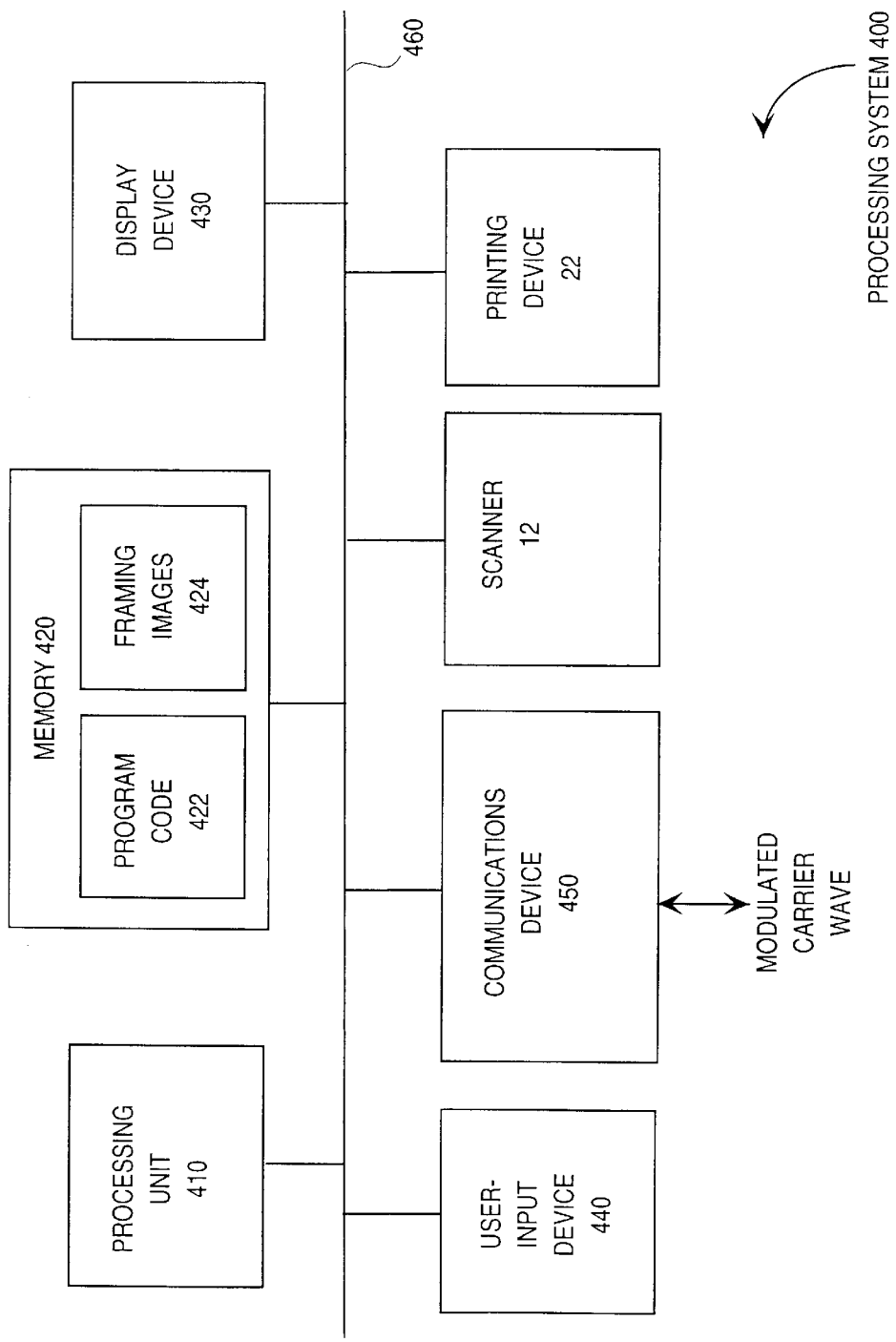
FIG. 4 is a block diagram of a processing system that can be used to perform processing operations in a photo kiosk according to embodiments of the present invention.

FIG. 4 is a block diagram of an embodiment of a processing system 400 that can be used in a photo kiosk to perform the above-described processing operations. The processing system 400 includes a processing unit 410, memory 420, display device 430, user-input device 440, communications device 450, scanner 12 and printing device 22, each coupled to a bus structure 460. In the case of the photo kiosk 10 of FIGS. 1A and 1B, the display device 430 and the user-input device 440 may be implemented by a touch-sensitive screen. In alternate embodiments, other devices may be used to manipulate elements displayed on the display device 430 and to allow a user to input information and selections into the processing system 400.

The processing unit 410 may include one or more general purpose processors, one or more digital signal processors or any other devices capable of executing a sequence of instructions. When programmed with appropriate instructions, the processing unit may be used to implement the kiosk processor 18 shown in FIGS. 1A and 1B, wherein the kiosk processor 18 includes, but is not limited to, an edge processor, edge analyzer, edge finder, pixel processor, and so forth for performing the above described processing operations.

The communications device 450 may be a modem, area network card or any other device for coupling the processing system 400 to a computer network. The communications device 450 may be used to generate or receive a carrier wave modulated with a data signal, for example, for obtaining images or text from a server computer on the World Wide Web or other network, or for receiving updated program code or function-extending program code that can be executed by the processing unit 410 to implement embodiments of the present invention.

The memory 420 may include both system memory and non-volatile storage devices such as magnetic tape, magnetic disk, optical disk, electrically erasable programmable read only memory (EEPROM), or any other computer-readable medium. As shown in FIG. 4, the memory 420 may be used to store program code 422 for performing the above-described processing operations and images 424 that have been scanned using scanner 12. In one embodiment, when power is applied to the processing system 400, operating system program code is loaded from non-volatile storage into system memory by the processing unit 410 or another device, such as a direct memory access controller (not shown). Sequences of instructions comprised by the operating system are then executed by processing unit 410 to load other sequences of instructions, including the above-described processing applications, from non-volatile storage into system memory. Thus, program code for performing or controlling operations in a photo kiosk according to embodiments of the present invention may be obtained from a computer-readable medium, including the above-described carrier wave, and executed in the processing unit 410.

It should be noted that the individual processing operations described above may also be performed by specific hardware components that contain hard-wired logic to carry out the recited operations or by any combination of programmed processing components and hard-wired logic. Nothing disclosed herein should be construed as limiting the processing system or other components of a photo kiosk to a single embodiment wherein the recited operations are performed by a specific combination of hardware components.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

```
class GRAPHICLIBDEC PAutoCropping
{
    public:
        PAutoCropping(void);
        ~PAutoCropping(void);
        uint32 LengthThreshold(void);
        void SetLengthThreshold(uint32 val);
        uint32 ThicknessThreshold(void);
        void SetThicknessThreshold(uint32 val);
        sint32 GradientLowThreshold(void);
        void SetGradientLowThreshold(sint32 val);
        sint32 GradientHighThreshold(void);
        void SetGradientHighThreshold(sint32 val);
        uint32 Width( );
        uint32 Height( );
        bool CroppingArea(const NPixelBufferMgr& image,
            uint32* Xorigin, uint32* Yorigin, uint32* Xsize,
            uint32* Ysize, float* rotation);
        bool ComputeIntensity(const NPixelBufferMgr& image);
        bool ComputeLaplace3x3(const NPixelBufferMgr& image,
            sint32 highthreshold);
        bool ScratchRemoval(uint32 lengththreshold, uint32
            lowthreshold; uint32 thickthreshold);
        void EdgeHysterysisFollow(bool* map, uint32 i, uint32 j,
            sint32 lowthreshold, pEdgeIterator* list);
        bool BoundingRectangle(uint32* Xorigin, uint32* Yorigin,
            uint32* Xsize, uint32*, Ysize, float* rotation);
        bool AllocateIntensity(void);
        bool AllocateEdges(void);
        bool AllocateGradient(void);
```

-continued

```
        void ClearIntensity(void);
        void ClearEdges(void);
        void ClearGradient(void);
        sint32**    intensity;
        sint32*     gradient;
        bool*       edges;
        uint32      width;
        uint32      height;
        uint32      length_threshold;
        uint32      thick_threshold;
        sint32      gradient_low_threshold;
        sint32      gradient_high_threshold;
};
inline uint32 PAutoCropping::Width(void)
{ return width; }
inline uint32 PAutoCropping::Height(void)
{ return height; }
inline void PAutoCropping::ClearEdges(void)
{ if (edges) delete edges; edges = 0; }
inline bool PAutoCropping::AllocateEdges(void)
{ ClearEdges( ); edges = new bool[width*height]; return (edges != 0); }
inline void PAutoCropping::ClearGradient(void)
{ if (gradient) delete gradient; gradient = 0; }
inline bool PAutoCropping::AllocateGradient(void)
{ ClearGradient( ); gradient = new sint32[width*height]; return
    (gradient != 0); }
inline uint32 PAutoCropping::LengthThreshold(void)
{ return length_threshold; }
inline void PAutoCropping::SetLengthThreshold(uint32 val)
{ length_threshold = val; }
inline uint32 PAutoCropping::ThicknessThreshold(void)
{ return thick_threshold; }
inline void PAutoCropping::SetThicknessThreshold(uint32 val)
{ thick_threshold = val; }
inline sint32 PAutoCropping::GradientLowThreshold(void)
{ return gradient_low_threshold; }
inline void PAutoCropping::SetGradientLowThreshold(sint32 val)
{ gradient_low_threshold = val; }
inline sint32 PAutoCropping::GradientHighThreshold(void)
{ return gradient_high_threshold; }
inline void PAutoCropping::SetGradientHighThreshold(sint32 val)
{ gradient_high_threshold = val; }
#define DEFAULT_LENGTH_THRESHOLD    20
#define DEFAULT_THICKNESS_THRESHOLD  3
#define DEFAULT_GRADIENT_LOW_THRESHOLD 10
#define DEFAULT_GRADIENT_HIGH_THRESHOLD 50
typedef sint32* sint32_ptr;
struct PStructEdgeElt;
typedef struct PStructEdgeElt *PEdgePtr;
typedef struct PStructEdgeElt
{
    uint32 row;
    uint32 column;
    bool *value;
    PEdgePtr next;
} PEdgeElt;
class PEdgeIterator
{
    public:
        PEdgeIterator( );
        ~PEdgeIterator( );
        void    AddTail(uint32 i, uint32 j, bool* val);
        PEdgePtr First(void);
        PEdgePtr Current(void);
        PEdgePtr Last(void);
        PEdgePtr Next(void);
        void Reset(void);
        void Validate(bool val = true);
        uint32 Size(void);
        uint32 size;
    private:
        PEdgePtr first;
        PEdgePtr current;
        PEdgePtr last;
};
inline PEdgeIterator::PEdgeIterator( )
{ first = current = last = 0; size = 0; }
inline PEdgePtr PEdgeIterator::First(void)
{ return first;}
inline PEdgePtr PEdgeIterator::Current(void)
{ return current; }
inline PEdgePtr PEdgeIterator::Last(void)
{ return last; }
inline PEdgePtr PEdgeIterator::Next(void)
{ return (current)?(current = current->next):0; }
inline void PEdgeIterator::Reset(void)
{ current = first; }
inline uint32 PEdgeIterator::Size(void)
{ return size; }
PEdgeIterator::~PEdgeIterator( )
{
    PEdgePtr cur = first, next;
    Reset( );
    while (cur != last)
    {
        next = Next( );
        delete cur;
        cur = next;
    }
}
void PEdgeIterator::AddTail(uint32 i, uint32j, bool* val)
{
    PEdgePtr cur = new PEdgeElt;
    cur->row = i;
    cur->column = j;
    cur->value = val;
    cur->next = 0;
    if (last)
        {
            last->next = cur;
            last = cur;
        }
    else
        first = last = current = cur;
    size++;
}
void PEdgeIterator: :Validate(bool val)
{
    PEdgePtr cur = first;
    Reset( );
    while (cur)
    {
        *(cur->value) = val;
        cur = Next( );
    }
}
bool PAutoCropping::CroppingArea(const NPixelBufferMgr& image,
                                 Uiflt32* Xorigin, uint32* Yorigin,
                                 uint32* Xsize, uint32* Ysize, float*
                                 rotation)
{
    width = image.Width( );
    height = image.Height( );
    bool ok = true;
    AllocateIntensity( );
    ok = ComputeIntensity(image);
    AllocateEdges( );
    AllocateGradient( );
    ok = ComputeLaplace3x3(image, sint32(gradient_high_threshold));
    ClearIntensity( );
    ok = ScratchRemoval(length_threshold, gradient_low_threshold,
        thick_threshold);
    ClearGradient( );
    ok = BoundingRectangle(Xorigin,Yorigin,Xsize,Ysize,rotation);
    return true;
}
PAutoCropping::PAutoCropping(void)
{
    intensity   = 0;
    gradient    = 0;
    edges       = 0;
    width       = 0;
    height      = 0;
    length_threshold  = DEFAULT_LENGTH_THRESHOLD;
    thick_threshold   = DEFAULT_THICKNESS_THRESHOLD;
    gradient_low_threshold =
        DEFAULT_GRADIENT_LOW_THRESHOLD;
    gradient high_threshold =
```

-continued

```
        DEFAULT_GRADIENT_HIGH_THRESHOLD;
}
bool PAutoCropping::ComputeIntensity(const NPixelBufferMgr& image)
{
    register uint32 pix = 0;
    register uint32 i = 0;
    register uint32 j = 0;
    register uint32 imax = height;
    register uint32 jmax = width;
    for (i=0; i<imax; i++)
        for (j=0; j<jmax; j++)
        {
            pix = uint32(image.Row(i)[j]);
            intensity[i+1][j+1] = sint32(0.299*float
                ((pix&0X00FF0000L)>>16) +
                0.587*float((pix&0X0000FF00L)>>8) +
                0.114*float(pix&0X000000FFL));
        }
    for (j= 0; j < width+2; j++)
    {
        intensity[0][j] = intensity[1][j];
        intensity[height+1][j] = intensity[height][j];
    }
    for (i = 0; i < height+2; i++)
    {
        intensity[i][0] = intensity[i][1];
        intensity[i][width+1] = intensity[i][width];
    }
    return true;
}
bool PAutoCropping::ComputeLaplace3x3(const NPixelBufferMgr&
                image, sint32 highthreshold)
{
    register uint32 i = 0;
    register uint32 j = 0;
    register sint32* gradient_ptr = 0;
    register bool* edges_ptr = 0;
    register uint32 imax = height;
    register uint32 jmax = width;
    for (gradient_ptr=gradient, i=1; i<imax+1; i++)
        for (j=1; j<jmax+1; j++, gradient_ptr ++)
        {
            (*gradient_ptr) = sint32(intensity[i-1][j-1] +
                intensity[i][j-1] + intensity[i+1][j-1] +
                intensity[i-1][j+1] + intensity[i][j+1] + intensity[i+1][j+1])
                - sint32((intensity[i][j] + intensity[i-1 ][j]+
                intensity[i+1][j])<<1);
            if (*gradient_ptr < 0) *gradient_ptr =- *gradient_ptr;
        }
    for (gradient_ptr_gradient, edges_ptr = edges, i=0; i<imax; i++)
        for (j=0; j<jmax; j++, gradient_ptr ++, edges_ptr++)
        {
            if (*gradient_ptr > highthreshold)
                *edges_ptr = true;
        }
    for (gradient_ptr=gradient, edges_ptr=edges, i=1; i<imax+1; i++)
        for (j=1; j<jmax+1; j++, gradient_ptr ++, edges_ptr++)
        {
            if (!(*edges_ptr))
                (*gradient_ptr) = sint32(intensity[i-1][j-1] +
                intensity[i-1][j] + intensity[i-1][j+1]+ intensity[i+1][j-1]
                + intensity[i+1][j] + intensity[i+1][j+1])
                - sint32((intensity[i][j] + intensity[i][j-1] +
                intensity[i][j+1])<<1);
        }
    for (gradient_ptr_gradient, edges_ptr = edges, i=0; i<imax; i++)
        for (j=0; j<jmax; j++, gradient_ptr ++, edges_ptr++)
        {
            if (!(*edges_ptr) && ((*gradient_ptr < minusthreshold) ||
                (*gradient_ptr > highthreshold)))
                *edges_ptr = true;
        }
    return true;
}
bool PAutoCropping::ScratchRemoval(uint32 lengththreshold,
                uint32 lowthreshold, uint32 thickthreshold)
{
    bool *left_known = new bool[width*height];
    register uint32 i = 0;
    register uint32 j = 0;
    register bool *known_ptr = left_known;
    register bool *edges_ptr = edges;
    bool thick_check = true;
    for (i=0; i<height; i++)
    {
        for (j=0, known_ptr=left_known+i*width,
                edges_ptr=edges+i*width; j<width;
                    j++, known_ptr++, edges_ptr++)
        {
            PEdgeIterator list;
            thick _check = true;
            if ((*edges_ptr) && !(*known_ptr))
            {
                *known_ptr = true;
                EdgeHysterysisFollow(left_known, i, j, lowthreshold,
                    &list);
            }
            if (list.Size( ) < lengththreshold)
                list.Validate(false);
            else
                list.Validate(true);
        }
    }
    delete left_known;
return true;
}
void PAutoCropping::EdgeHysterysisFollow(bool* map, uint32 i,
                uint32 j, sint32 lowthreshold, pEdgeIterator* list)
{
    uint32 shift = i*width + j;
    register bool *known_ptr = map+shift;
    register bool *edges_ptr = edges+shift;
    register sint32 *gradient_ptr = gradient+shift;
    list->AddTail(i,j,edges_ptr);
    if (j+1<width)
    {
        if ( !(*(known_ptr+1)))
        {
            *(known_ptr+1) = true;
            if (*(gradient_ptr+1) > lowthreshold)
                EdgeHysterysisFollow(map, i, j+1, lowthreshold, list);
        }
        if ((i>0) && !(*(known_ptr-width+1)))
        {
            *(known_ptr-width+1) = true;
            if (*(gradient_ptr-width+1) > lowthreshold)
                EdgeHysterysisFollow(map, i-1, j+1, lowthreshold,
                    list);
        }
        if ((i+1<height) && !(*(known_ptr_width+1)))
        {
            *(known_ptr_width+1) = true;
            if (*(gradient_ptr_width+1) > lowthreshold)
                EdgeHysterysisFollow(map, i+1, j+1, lowthreshold,
                    list);
        }
    }
    if (i+1<height)
    {
        if (!(*(known_ptr+width)))
        {
            *(known_ptr+width) = true;
            if (*(gradient_ptr+width) > lowthreshold)
                EdgeHysterysisFollow(map, i+1, j, lowthreshold, list);
        }
        if ((j>0) && !(*(known_ptr+width-1)))
        {
            *(known_ptr+width-1) = true;
            if (*(gradient_ptr+width-1) > lowthreshold)
                EdgeHysterysisFollow(map, i+1, j-1, lowthreshold,
                    list);
        }
    }
    if (i>0)
    {
        if (!(*(known_ptr-width)))
        {
            *(known_ptr-width) = true;
            if (*(gradient_ptr-width) > lowthreshold)
```

-continued

```
                EdgeHysterysisFollow(map, i-1 , j, lowthreshold, list);
            }
            if (j>0) && !(*(known_ptr-width-1)))
            {
                *(known_ptr-width-1) = true;
                if (*(gradient_ptr-width-1) > lowthreshold)
                    EdgeHysterysisFollow(map, i-1, j-1, lowthreshold,
                            list);
            }
        }
        if (j>0) && !(*(known_ptr-1)))
        {
            *(known_ptr-1) = true;
            if (*(gradient_ptr-1) > lowthreshold)
                EdgeHysterysisFollow(map, i, j-1, lowthreshold, list);
        }
    }
}
bool PAutocropping::BoundingRectangle(uint32* Xorigin, uint32*
                    Yorigin, uint32* Xsize, uint32* Ysize, float*
                    rotation)
{
    register uint32 i = 0;
    register uint32 j = 0;
    register uint32 imax = height;
    register uint32jmax = width;
    *Xorigin = 0;
    *Yorigin = 0;
    *Xsize = width;
    *Ysize = height;
    bool found = false;
    bool* edges_ptr = edges;
    for (i=0; (!found) && (i<imax); i++)
        for (j=0; j<jmax; j++, edges_ptr++)
            if (*edges_ptr)
            {
                found = true;
                break;
            }
    *Yorigin =i;
    found = false;
    for (j=0, edges_ptr = edges; (!found) && (j<jmax); j++, edges_ptr =
            edges + j)
        for (i=(*Yorigin), edges_ptr += width*(*Yorigin); i<imax; i++,
                edges_ptr+=width)
            if (*edges_ptr)
            {
                found = true;
                break;
            }
    *Xorigin = j;
    found = false;
    for (j=jmax-1, edges_ptr = edges +j; (!found) && (j>=0); j--,
            edges_ptr = edges + j)
        for (i=(*Yorigin), edges_ptr += width*(*Yorigin); i<imax; i++,
                edges_ptr+=width)
            if (*edges_ptr)
            {
                found = true;
                break;
            }
    *Xsize =j-*Xorigin;
    found = false;
    for (i=imax-1, edges_ptr = edges + i*width; (!found) && (i>=0);
                i-1 , edges_ptr = edges + i*width)
        for (j=0; j<jmax; j++; edges_ptr++)
            if (*edges_ptr)
            {
                found = true;
                break;
            }
    *Ysize = i-*Yorigin;
return true;
}
PAutoCropping::-18 PAutoCropping(void)
{
    ClearIntensity( );
    ClearEdges( );
    ClearGradient( );
}
```

```
void PAutoCropping::ClearIntensity(void)
{
    if (intensity && height)
    {
        for (unit32 i = 0; i < height +2; i++)
            delete intensity[i];
        delete intensity;
    }
    intensity = 0;
}
bool PAutoCropping::AllocateIntensity(void)
{
    ClearIntensity( );
    book ok = true;
    if (height)
    {
        ok = (intensity = new sint32_ptr[height+2]) != 0;
        for (uint32 j=0; ok && (j<height+2); j++)
            ok = (intensity[j] = new sint32[width+2]) != 0;
    }
    return ok;
}
```

What is claimed is:

1. A method for determining the orientation of a scanned image for use within a photo kiosk having a scanner therein, comprising:

positioning a user-provided picture on a scanner bed of the kiosk scanner in an arbitrary orientation;

scanning, using the kiosk scanner, a preliminary region of the scanner bed having the picture positioned therein, to produce a preliminary scanned image containing pixels therein; determining a plurality of bounding boxes confining the picture within the preliminary scanned image;

selecting one of the plurality of bounding boxes confining the picture; and calculating a positioning angle based on the selected bounding box.

2. The method of claim 1 wherein the scanned image is produced by scanning a region of the scanner bed having the picture positioned thereon.

3. The method of claim 1 wherein the scanned image is the first scanned image.

4. The method of claim 1 wherein each of the plurality of bounding boxes is associated with an angle, and wherein the positioning angle is the angle associated with the selected bounding box.

5. The method of claim 1 wherein the bounding boxes confine the significant edges of the preliminary scanned image.

6. The method of claim 1 wherein the selected bounding box is a bounding box having a smallest width.

7. The method of claim 1 wherein the selected bounding box is a bounding box having a smallest height.

8. The method of claim 1 wherein the selected bounding box is a bounding box having a smallest area.

9. The method of claim 1 wherein said determining step comprises:

identifying significant edges of the preliminary scanned image; and calculating bounding boxes based on the significant edges of the edge map.

10. The method of claim 9 wherein said identifying step comprises:

applying an edge filter to the preliminary scanned image, to produce an edge map having edge values at pixel locations within the preliminary scanned image; and locating significant edges within the edge map.

11. The method of claim 10 wherein the edge filter is a Sobel filter.

12. The method of claim 10 wherein said locating step comprises selecting pixels within the preliminary scanned image that are part of a group of at least twenty adjacent pixels each of which has an edge value above a prescribed lower threshold value and at least one of which has an edge value above a prescribed upper threshold value.

13. A system for determining the orientation of a scanned image for use within a photo kiosk, comprising:

a kiosk scanner including a kiosk scanner bed for positioning a picture thereon in-an arbitrary orientation;

a kiosk processor determining a plurality of bounding boxes confining the picture within the preliminary scanned image;

a selector selecting one of the plurality of bounding boxes confining the picture; and an image processor calculating a positioning angle based on the selected bounding box.

14. The system of claim 13 wherein the scanned image is produced by scanning a region of the kiosk scanner bed having the picture positioned thereon.

15. The system of claim 13 wherein the scanned image is the first scanned image.

16. The system of claim 13 wherein each of the plurality of bounding boxes is associated with art angle, and wherein the positioning angle is the angle associated with the selected bounding box.

17. The system of claim 13 wherein the bounding boxes confine the significant edges of the preliminary scanned image.

18. The system of claim 13 wherein the selected bounding box is a bounding box having a smallest width.

19. The system of claim 13 wherein the selected bounding box is a bounding box having a smallest height.

20. The system of claim 13 wherein the selected, bounding box is a bounding box having a smallest area.

21. The system of claim 13 wherein said kiosk processor comprises:

an edge analyzer identifying significant edges of the preliminary scanned image; and a pixel processor calculating bounding boxes based on the significant edges of the edge map.

22. The system of claim 21 wherein said edge analyzer comprises:

an edge processor applying an edge filter to the preliminary scanned image, to produce an edge map having edge values at pixel locations within the preliminary scanned image; and an edge finder locating significant edges within the edge map.

23. The system of claim 22 wherein the edge filter is a Sobel filter.

24. The system of claim 22 wherein said edge finder comprises a pixel selector selecting pixels within the preliminary scanned image that are part of a group of at least twenty adjacent pixels each of which has an edge value above a prescribed lower threshold value and at least one of which has an edge value above a prescribed upper threshold value.

* * * * *